(12) United States Patent
Wei et al.

(10) Patent No.: US 6,373,018 B1
(45) Date of Patent: Apr. 16, 2002

(54) APPARATUS AND METHOD FOR ELECTRICAL DISCHARGE MACHINING MULTIPLE HOLES

(75) Inventors: Bin Wei, Clifton Park; Martin Kin-Fei Lee, Niskayuna, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/499,162

(22) Filed: Feb. 7, 2000

(51) Int. Cl.[7] .............................. B23H 1/00; B23H 7/26
(52) U.S. Cl. ................. 219/69.11; 219/69.15; 219/69.2
(58) Field of Search .................. 219/69.11, 69.15, 219/69.14, 69.17, 69.2

(56) References Cited

U.S. PATENT DOCUMENTS

| | | | | |
|---|---|---|---|---|
| 4,441,004 A | * | 4/1984 | Inoue | 219/69.15 |
| 5,041,709 A | * | 8/1991 | Schneider et al. | 219/69.15 |
| 5,075,530 A | * | 12/1991 | Lee | 219/69.15 |
| 5,444,204 A | * | 8/1995 | Derighetti | 219/69.11 |

FOREIGN PATENT DOCUMENTS

| | | | | |
|---|---|---|---|---|
| GB | 2248032 | * | 3/1992 | 219/69.15 |
| JP | 62-4527 | * | 1/1987 | 219/69.2 |
| JP | 62-84929 | * | 4/1987 | |

* cited by examiner

*Primary Examiner*—Geoffrey S. Evans
(74) *Attorney, Agent, or Firm*—Patrick K. Patnode; Christian G. Cabou

(57) ABSTRACT

An apparatus for electrical discharge machining multiple holes in an electrically conductive work piece, includes an electrical discharge machine for rotatably mounting a first electrode, and at least one electrical discharge unit for rotatably mounting at least one second electrode. The electrical discharge machine includes a driver and a controller, the driver is desirably coupled to the electrical discharge machine and the electrical discharge unit for rotating the first electrode and the at least one second electrode, and the controller is desirably coupled to the electrical discharge machine and the at least one electrical discharge unit for controlling a supply of electrical energy from the first electrode and second electrode to the workpiece.

14 Claims, 4 Drawing Sheets

APPARATUS AND METHOD FOR ELECTRICAL DISCHARGE MACHINING MULTIPLE HOLES

BACKGROUND OF THE INVENTION

The present invention generally relates to electrical discharge machining. More particularly, the present invention relates to an apparatus and method for electrical discharge machining of multiple holes.

Multiple hole drilling using electrical discharge machining (EDM) is accomplished by using a multiple tooling assembly which is also known as a Acomb-tool.@ The tooling assembly includes a plurality of fixed or non-rotating electrodes mounted on a ram of an EDM machine. A drawback with such a tooling assembly is that it is difficult to flush the dielectric fluid from small, deep holes, and therefore the process is extremely slow, and only suitable for drilling multiple non-circular holes.

High speed electrical discharge machining uses a spinning tubular electrode, a dielectric fluid and high pressure flushing through the electrode center for drilling a single circular hole.

Some high speed EDM machines incorporate a pair of spindles mounted in proximity to one another for spinning a pair of electrodes for machining a pair of holes simultaneously. In such a system each spindle operates independently having separate motor drives and control systems for each electrode. A system of this type is significantly more costly than a single spindle system, and the spindles are in a fixed position in relation to one another, making adjustment difficult if not impossible.

SUMMARY OF THE INVENTION

Therefore, a need exists for a high speed EDM capable of drilling multiple holes at the same time and in which a plurality of rotatable electrodes are adjustably positioned in relation to one another. The above-mentioned needs are satisfied by the present invention which provides, in a first aspect, an apparatus for electrical discharge machining multiple holes in an electrically conductive work piece, in which the apparatus includes an electrical discharge machine for rotatably mounting a first electrode, the electrical discharge machine comprising a driver and a controller, at least one electrical discharge unit for rotatably mounting at least one second electrode, wherein the driver is coupled to the electrical discharge machine and the electrical discharge unit for rotating the first electrode and the at least one second electrode, and the controller is coupled to the electrical discharge machine and the at least one electrical discharge unit for controlling a supply of electrical energy from the first electrode and second electrode to the workpiece.

In a second aspect, a device is provided for use with an electrical discharge machining machine for machining multiple holes in a work piece in which the device includes a plurality of electrical discharge units for rotatably mounting a plurality of electrodes and a drive mechanism coupled to the plurality of electrical discharge units and couplable to a driver of the electrical discharge machine for rotating the plurality of electrodes.

DETAILED DESCRIPTION OF THE INVENTION

Figure 1:
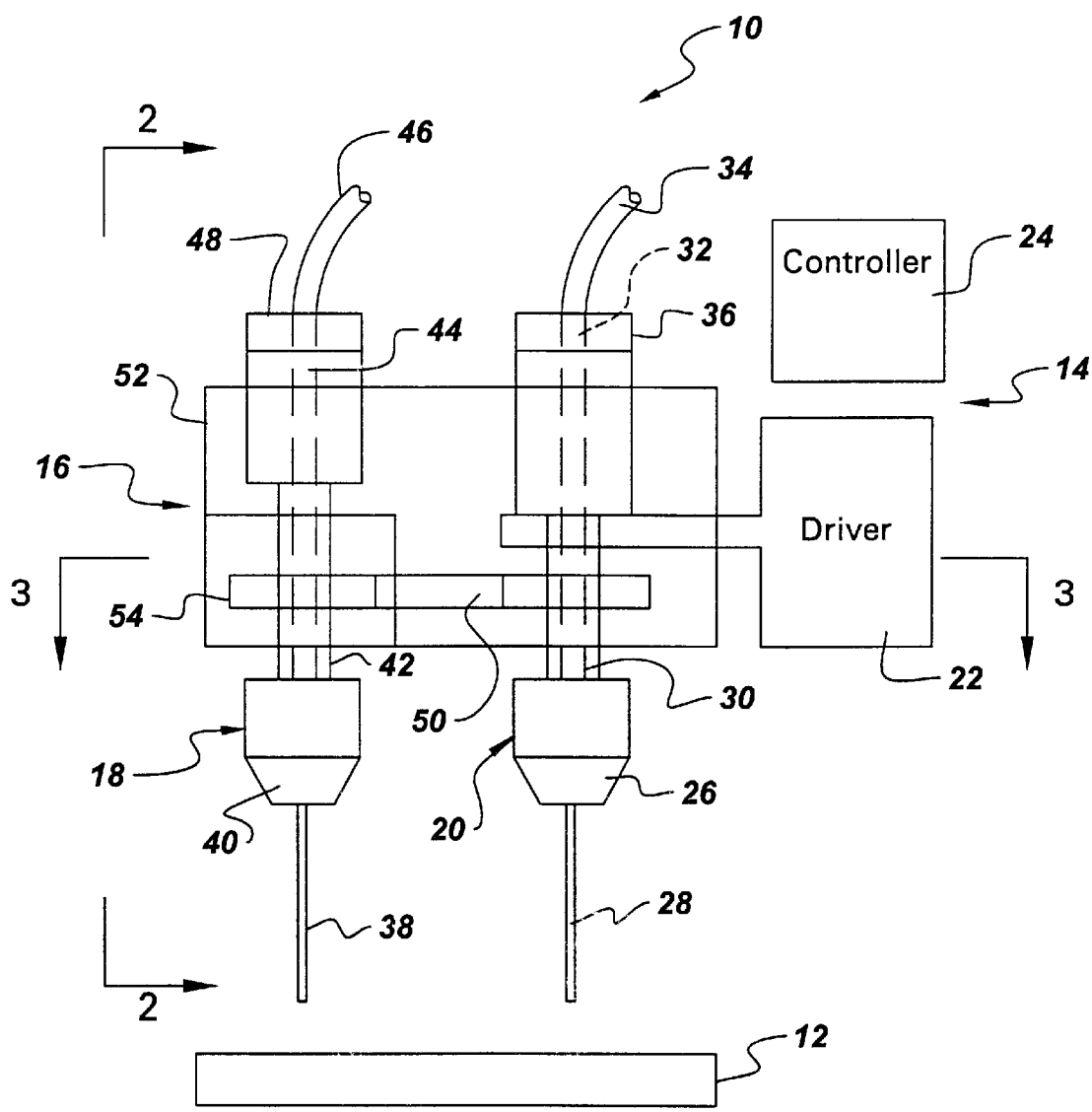
FIG. 1 is a schematic, elevational view of an apparatus of the present invention for electrical discharge machining of multiple holes.

FIG. 1 schematically illustrates an exemplary apparatus 10 for electrical discharge machining of multiple holes in a workpiece 12. Apparatus 10 includes an electrical discharge machine 14 and an attachment device 16 having a plurality of electrical discharge units 18. Electrical discharge machine 14 includes an electrical discharge unit 20, a driver 22, and a controller 24.

Electrical discharge unit 20 includes a main spindle 26 which is releasably attachable to an electrode 28. Main spindle 26 is attached to an electrically conductive body 30 which is coupled to and rotated by driver 22. Driver 22 may comprise a motor and servo-control unit (not shown) for rotating or vertically moving electrical discharge unit 20. Controller 24 is connected to body 30 and provides a regulated voltage to electrode 28 via a power supply (not shown) and controls the servo-control unit for vertically positioning electrode 28 relative to workpiece 12. Controller 24 is also electrically coupled to workpiece 12. Body 30 includes supply bore 32 formed lengthwise therethrough. Supply bore 32 fluidly connects a fluid supply conduit 34 to electrode 28 by use of a coupler 36. Fluid supply conduit 34 is fed from one or more fluid tanks (not shown), and supplies electrode 28 with a dielectric fluid.

Coupled to electrical discharge machine 14 are a plurality of electrical discharge units 18. Each of electrical discharge units 18 comprise an electrode 38 mounted in a sub-spindle 40 and coupled to an electrically conductive body 42. Body 42 includes supply bore 44 formed lengthwise therethrough. Supply bore 44 fluidly connects a fluid supply conduit 46 to electrode 38 by use of a coupler 48. Fluid supply conduit 46 may be fed from one or more fluid tanks (not shown), and supplies electrode 38 with a dielectric fluid.

Electrical discharge unit 18 is couplable to driver 22 of electrical discharge machine 14 by use of a driving mechanism 50, for example, a driving belt. Desirably, driving mechanism 50 is a positive engagement belt, such as a toothed or perforated belt which engages body 30 of main spindle 26 and engages body 42 of sub-spindles 40 for rotating electrodes 38.

During machining, a suitable dielectric fluid is supplied to a dielectric entrance of electrodes 28 and 38 under sufficient pressure to force the dielectric fluid through a supply bore within the electrodes and out a dielectric exit at the tip of the electrodes. The flow rate of dielectric fluid may be regulated or adjusted by independent regulating valves (not shown) located on respective fluid supply conduits 34,44. The dielectric fluid fills a gap formed between the electrode and the work piece. As the fluid passes up through this gap and out the hole being drilled, the dielectric fluid flushes machining effluent, such as eroded work piece material, out of the hole.

Controller 24 provides electrical power to electrical discharge units 18 and 20. The electrical power may be provided through electrical couplings, for example metal brushes, connecting each of the units to the power supply or alternatively, the units may be housed within an electrically conductive frame which is electrically coupled to the power supply. Therefore even upon rotation of units 18, voltage from the power supply will flow through the frame and be applied to electrodes 38.

Figure 2:
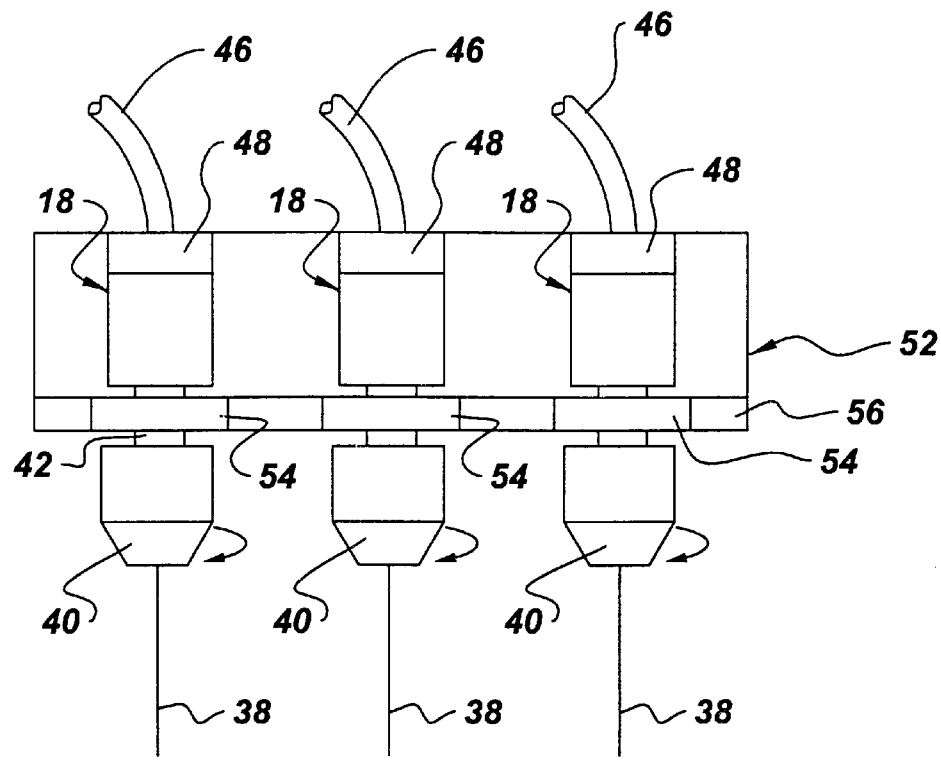
FIG. 2 is a view taken in the direction of arrows 2—2 of FIG. 1.

As shown in FIG. 2, the plurality of electrical discharge units 18 are mounted within a frame unit 52. Each of the electrical discharge units may be mounted on a bearing 54 which is housed within a bearing block 56. The position of each electrical discharge unit 18 may be adjusted by moving bearing 54 within bearing block 56 to a desired location and securing it in place with a locking mechanism such as lock nuts, clamps, set screws, or other mechanisms as may be known in the art. Alternatively in the case where high precision of hole locations are required, bearings 54 may be secured in a fixed position within frame 52. Frame 52 is desirably constructed from an electrically conductive material such as stainless steel or other suitable materials having similar properties.

Figure 3:
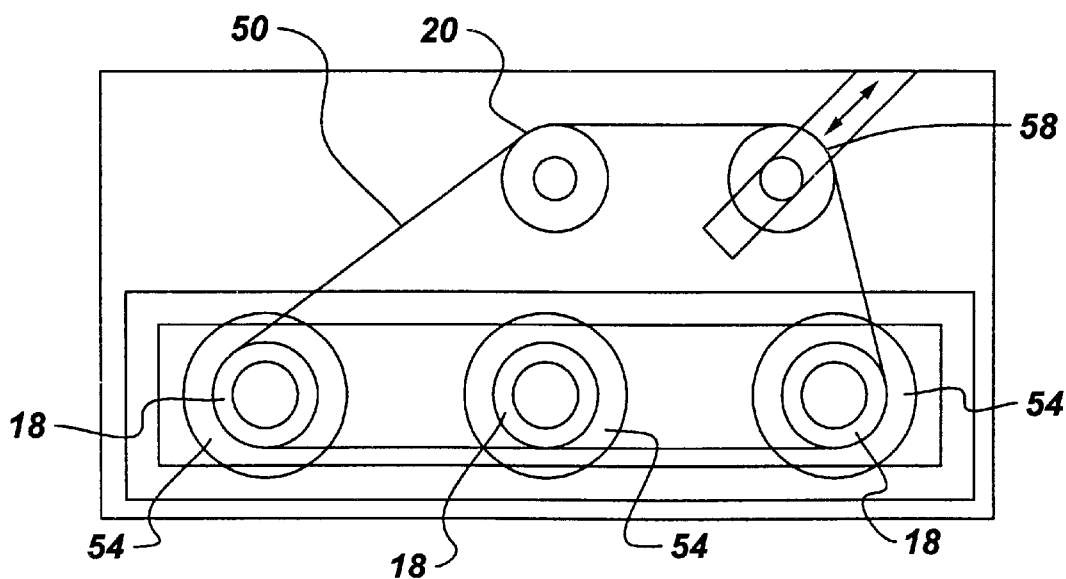
FIG. 3 is a cross-sectional view taken along line 3—3 of FIG. 1.

FIG. 3 illustrates driving mechanism 50 engaging electrical discharge machine 14 for transferring rotational movement to electrical discharge units 18. A belt adjustment mechanism 58 may be used to adjust the tension of driving mechanism 50 so all electrical discharge units may be effectively rotated.

Figure 4:
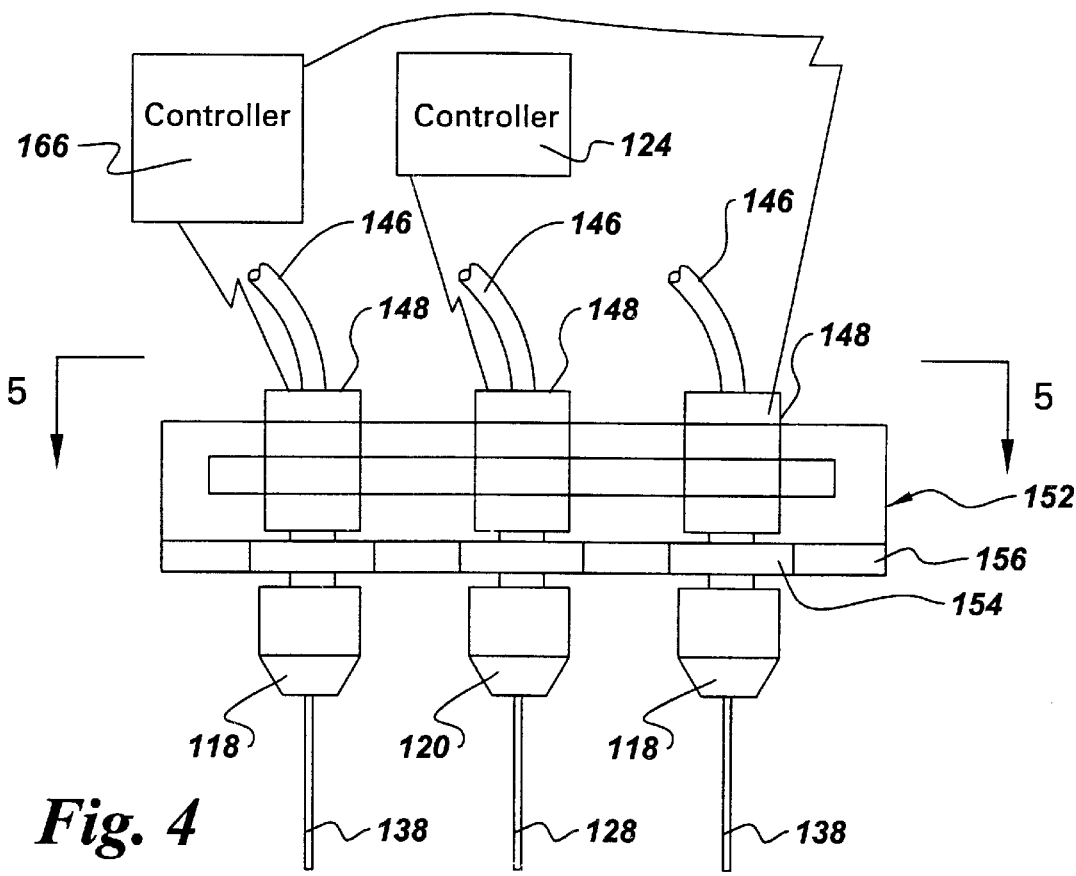
FIG. 4 is an alternate embodiment of a driving mechanism of the present invention.
Figure 5:
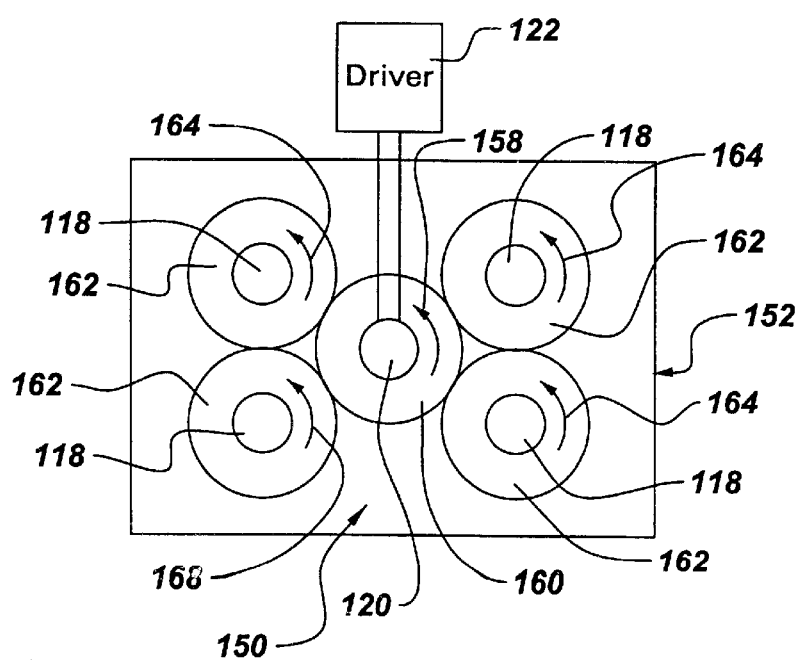
FIG. 5 is a cross-sectional view taken along lines 5—5 of FIG. 4.

FIGS. 4 and 5 illustrate an alternative driving mechanism 150 for transferring rotational movement from a driver 122 (FIG. 5) operably coupled to a plurality of electrical discharge units 118 for rotation of a plurality of (electrodes) 138 (FIG. 4). Electrical discharge units 118 may be mounted on a bearing 154 which is housed within a bearing block 156 within frame 152 in a similar manner as described above.

A driver 122 is coupled to and rotates an electrical discharge unit 120 in the direction of arrow 158. A main gear 160 mounted on electrical discharge unit 120 engages a plurality of sub-gears 162. Sub-gears 162 are individually mounted on electrical discharge units 118, and their rotation causes sub-spindles 140 to rotate in the direction of arrows 164. Main gear 160 and sub-gears 162 may be constructed from an electrically conductive material such as stainless steel or the like or alternatively they may be constructed from a plastic or rubber material. Main gear 160 and sub-gears 162 may be toothed to provide relatively inflexible but reliable rotational control or alternatively the gears may be smoothed as desired. FIG. 5 illustrates an exemplary configuration of the electrical discharges unit configuration. However, the electrical discharge units 118 may be placed in a linear or other alternative configuration as may be desired.

A controller 124 is connected to electrical discharge unit 120 and provides a regulated voltage to electrode 128 via a power supply (not shown) and controls the servo-control unit for vertically positioning electrode 128. Controller 124 may be connected to electrical discharge units 118 to provide a regulated voltage to electrodes 138, or alternatively, a second controller 166 may be connected to electrical discharge units 118 to provide a regulated voltage to electrodes 138.

In the case where high precision of the center locations of the holes are required, a template with non-adjustable bearing seats may be used for positioning the electrical discharge units.

Figure 6:
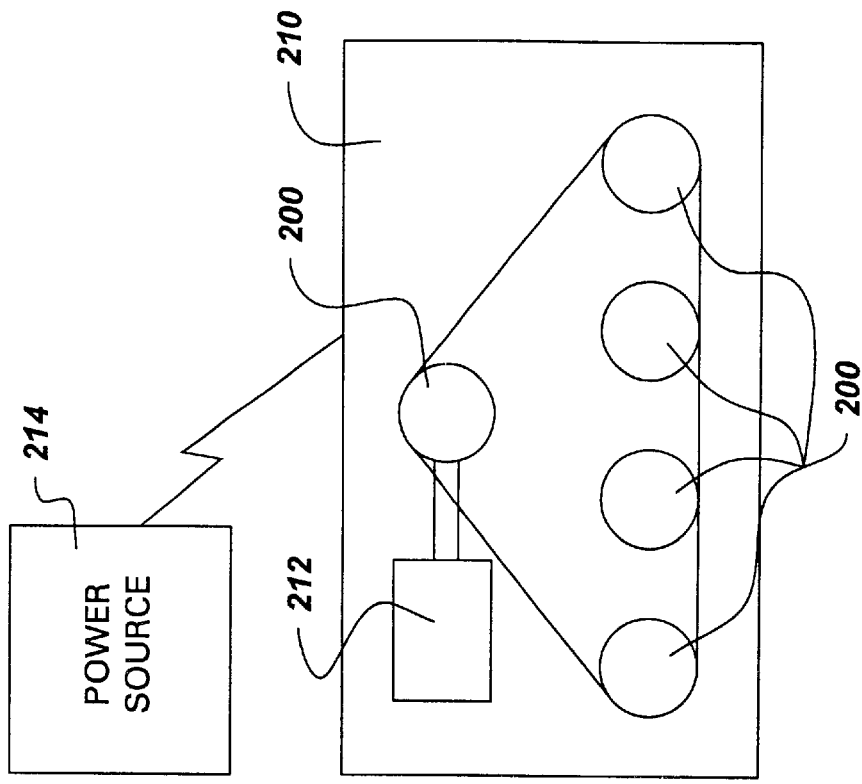
FIG. 6 is a schematic view of an alternative embodiment of an apparatus of the present invention for electrical discharge machining of multiple holes.
Figure 6:
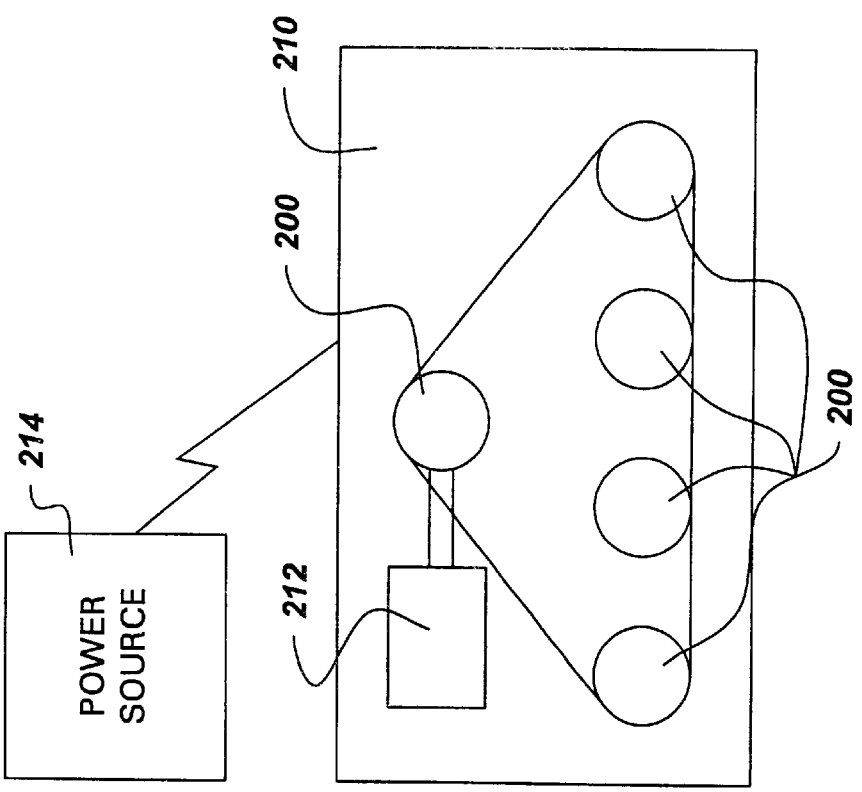

When it is desired to machine a large number of holes simultaneously, multiple controllers, drivers and power sources may be used. As illustrated in FIG. 6, a plurality of electrical discharge units 200 may be mounted on a series of frames 210. Each of the electrical discharge units 200 may have a separate driver 212 and power source 214. Each driver 212 may provide rotational movement for a series of electrical discharge units 200 by using a driving mechanism such as a driving belt, gears, or rubber rollers as described above. Separate power sources may provide the design voltage for a series of electrical discharge units in a more efficient manner than a single source.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An apparatus for electrical discharge machining multiple holes in an electrically conductive work piece, the apparatus comprising:
    an electrical discharge machine for rotatably mounting a first electrode, said electrical discharge machine comprising a driver and a controller;
    at least one electrical discharge unit for rotatably mounting at least one second electrode; and
    a frame for horizontally adjustably positioning independently said at least one electrical discharge unit,
    wherein said driver is coupled to said electrical discharge machine and to said electrical discharge unit for rotating the first electrode and the at least one second electrode, and said controller being coupled to said electrical discharge machine and said at least one electrical discharge unit for controlling a supply of electrical energy from the first electrode and second electrode to the workpiece.

2. The apparatus of claim 1 wherein said controller is coupled to said electrical discharge machine and to said at least one electrical discharge unit for controllably supplying electrical energy from the first electrode and the at least one second electrode to the workpiece.

3. The apparatus of claim 1 wherein said driver is coupled to said electrical discharge machine and to said at least one second electrical discharge unit for rotating the first electrode and the at least one second electrode, and said controller is coupled to said electrical discharge machine and to said at least one electrical discharge unit for controlling the supply of electrical energy from the first electrode and the at least one second electrode to the workpiece.

4. The apparatus of claim 1 wherein each of said at least one electrical discharge units comprises a spindle for releasably and rotatably mounting the electrode.

5. The apparatus of claim 1 wherein said at least one electrical discharge unit comprises a dielectric coupler fluidly connectable to a supply of dielectric fluid.

6. A device for use with an electrical discharge machining machine for machining multiple holes in a work piece, said device comprising:
    a plurality of electrical discharge units for rotatably mounting a plurality of electrodes; and
    a frame for horizontally adjustably positioning independently said plurality of electrical discharge units;
    a drive mechanism coupled to said plurality of electrical discharge units and couplable to a driver of the electrical discharge machine for rotating the plurality of electrodes.

7. The device of claim 6 further comprising a controller for controlling a supply of electrical energy to said plurality of electrodes.

8. The device of claim 6 wherein each of said plurality of electrical discharge units comprises a spindle for releasably and rotatably mounting the electrode.

9. The device of claim 6 wherein each of said plurality of electrical discharge units comprise a dielectric coupler fluidly connectable to a supply of dielectric fluid.

10. An apparatus for electrical discharge machining multiple holes in an electrically conductive work piece comprising:
- a plurality of electrical discharge units for rotatably mounting a plurality of electrodes;
- means for horizontally adjustably positioning said electrical discharge units;
- means coupled to said plurality of electrical discharge units for rotating said plurality of electrodes; and
- means for controlling a supply of electrical energy from plurality of electrical discharge units to said work piece.

11. The apparatus of claim 10 wherein each of said plurality of electrical discharge units comprise a dielectric coupler fluidly connectable to a supply of dielectric fluid.

12. A device for use with an electrical discharge machining machine for machining multiple holes in a work piece, said device comprising:
- a plurality of electrical discharge units for rotatably mounting a plurality of electrodes;
- a frame for horizontally adjustably positioning independently said plurality of electrical discharge units; and
- means for rotating the plurality of electrodes, said means being couplable to a driver of the electrical discharge machine.

13. The device of claim 12, further comprising means for controlling a supply of electrical energy from the plurality of electrical discharge units to said work piece.

14. The device of claim 12 wherein said means for rotating the plurality of electrodes comprises a driver.

* * * * *